United States Patent
Gaarder et al.

(10) Patent No.: US 7,201,360 B2
(45) Date of Patent: Apr. 10, 2007

(54) PNEUMATIC DEVICE HAVING A SELECTIVELY VARIABLE ORIFICE

(75) Inventors: Barry Gaarder, Marshalltown, IA (US); Ronald Burr, Marshalltown, IA (US); Jack Tan, Marshalltown, IA (US)

(73) Assignee: Fisher Controls International, LLC., St. Louis, MO (US)

( * ) Notice: Subject to any disclaimer, the term of this patent is extended or adjusted under 35 U.S.C. 154(b) by 33 days.

(21) Appl. No.: 10/906,374

(22) Filed: Feb. 16, 2005

(65) Prior Publication Data

US 2006/0180215 A1   Aug. 17, 2006

(51) Int. Cl.
*F16K 47/04* (2006.01)
(52) U.S. Cl. ..................................... 251/206
(58) Field of Classification Search ......... 251/205–209
See application file for complete search history.

(56) References Cited

U.S. PATENT DOCUMENTS

| | | | |
|---|---|---|---|
| 4,643,215 A | | 2/1987 | Phlipot et al. |
| 4,655,246 A | * | 4/1987 | Phlipot et al. ......... 137/505.11 |
| 5,246,201 A | * | 9/1993 | Messick ..................... 251/208 |
| 5,417,083 A | * | 5/1995 | Eber ........................... 62/528 |
| 6,726,174 B2 | * | 4/2004 | Bareis et al. ............... 251/205 |
| 2003/0155017 A1 | | 8/2003 | Rogalski et al. |

FOREIGN PATENT DOCUMENTS

| | | |
|---|---|---|
| DE | 19807503 A1 | 8/1999 |
| DE | 19821648 A1 | 11/1999 |

OTHER PUBLICATIONS

International Search Report received in International (PCT) Application PCT/US2006/000066, by the European Patent Office, dated May 16, 2006.
Written Opinion for Appplication PCT/US2006/000066 by the European Patent Office, dated May 16, 2006.

* cited by examiner

*Primary Examiner*—J. Casimer Jacyna
(74) *Attorney, Agent, or Firm*—Marshall, Gerstein & Borun LLP

(57) ABSTRACT

A pneumatic device having a selectively variable pneumatic output comprises an inlet connectable to an air source and an outlet disposed in a flow path, a control assembly in the flow path and having a plurality of differently sized primary orifi. The control assembly includes a selector having a secondary orifice, the selector moveable relative to the primary orifi between a plurality of positions, the primary orifi and the secondary orifice arrangeable relative to one another to permit the secondary orifice to be in flow communication with a selected one of the primary orifi. The control assembly further blocks the remaining primary orifi when the secondary orifice is aligned with the selected one of the primary orifi.

24 Claims, 7 Drawing Sheets

US 7,201,360 B2

PNEUMATIC DEVICE HAVING A SELECTIVELY VARIABLE ORIFICE

FIELD OF THE INVENTION

The present invention relates generally to pneumatic devices such as pressure transducers and, more particularly, to a pneumatic device having a selectively variable orifice assembly for providing a selected pneumatic output signal.

BACKGROUND OF THE INVENTION

In pneumatic devices such as an electro-pneumatic transducer, it is necessary to convert an electrical signal to a proportional pneumatic output signal termed a pneumatic current. Such devices are typically referred to as "current-to-pressure" transducers. In such devices, a pressurized air supply is supplied to an air inlet, and this air supply must be converted within the device to a desired pneumatic current.

Additionally, electro-pneumatic transducers have dynamic characteristics that dictate how quickly the pneumatic current can be increased and/or decreased at the transducer output. This is generally termed the dynamic performance of the electro-pneumatic transducer. Typically, electro-pneumatic transducers use fixed restrictions within the pneumatic circuit that create a single dynamic characteristic or fixed dynamic performance within the transducer. Thus, there exists a continuing need for more control and selectability over the pneumatic output from the electro-pneumatic transducer.

SUMMARY OF THE INVENTION

In accordance with an aspect of the invention, a pneumatic device having a selectively variable pneumatic output comprises an air chamber having an inlet adapted for connection to a source of pressurized air and an outlet, the inlet and the outlet in flow communication along a flow path. An orifice plate is disposed in the flow path between the inlet and the outlet and includes a first primary orifice having a first size and a second primary orifice having a second size. A selector plate is disposed adjacent to the orifice plate and includes a control orifice, the selector plate and the orifice plate moveable relative to each other between a first position in which the control orifice is aligned with the first primary orifice to permit flow through the first primary orifice and the control orifice while blocking flow through the second primary orifice, and a second position in which the control orifice is aligned with the second primary orifice to permit flow through the second primary orifice and the control orifice while blocking flow through the first primary orifice.

In further accordance with a preferred embodiment, the orifice plate and the selector plate comprise concentric discs, and a seal or seal plate may be formed or otherwise disposed between the orifice plate and the selector plate, and having a through hole aligned with the control orifice of the selector plate. Preferably, the orifice plate and the selector plate are attached by a removable fastener.

The air chamber includes an access port having a removable cover, and wherein the orifice plate and the selector plate are removable through the access port. Preferably, O-rings are provided inside the chamber to provide suitable sealing. A filter may be disposed in the flow path, with the filter sized to abut at least one of the selector plate and the orifice plate. The O-rings may be sized to assist maintaining the filter and/or the orifice assembly in position.

Still preferably, each of the selector plate, the orifice plate and the seal plate includes a mounting aperture, and the mounting apertures may be axially aligned. A fastener may operatively and removably connect the orifice plate and the selector plate, with the fastener arranged to permit changing the orifice plate and the selector plate between the first position and the second positions.

In accordance with another aspect of the invention, a pneumatic device having a selectively variable pneumatic output comprises an inlet adapted for connection to a source of pressurized air and an outlet, the inlet and the outlet in flow communication along a flow path. A variable orifice plate is disposed in the flow path between the inlet and the outlet, with the variable orifice plate including a plurality of differently sized primary orifi. A selector plate is operatively associated with the variable orifice plate and includes a secondary orifice. The selector plate and the variable orifice plate are moveable relative to each other between a plurality of positions, with the primary orifi arranged on the variable orifice plate to permit the secondary orifice of the selector plate to be selectively aligned with any one of the primary orifi while blocking the remaining primary orifi.

In accordance with yet another aspect of the invention, A pneumatic device having a selectively variable pneumatic output comprises an inlet connectable to an air source and an outlet disposed in a flow path, a control assembly in the flow path and having a plurality of differently sized primary orifi. The control assembly includes a selector having a secondary orifice, the selector moveable relative to the primary orifi between a plurality of positions, the primary orifi and the secondary orifice arrangeable relative to one another to permit the secondary orifice to be in flow communication with a selected one of the primary orifi. The control assembly further blocks the remaining primary orifi when the secondary orifice is aligned with the selected one of the primary orifi.

DETAILED DESCRIPTION OF THE DISCLOSED EXAMPLE

Figure 1:
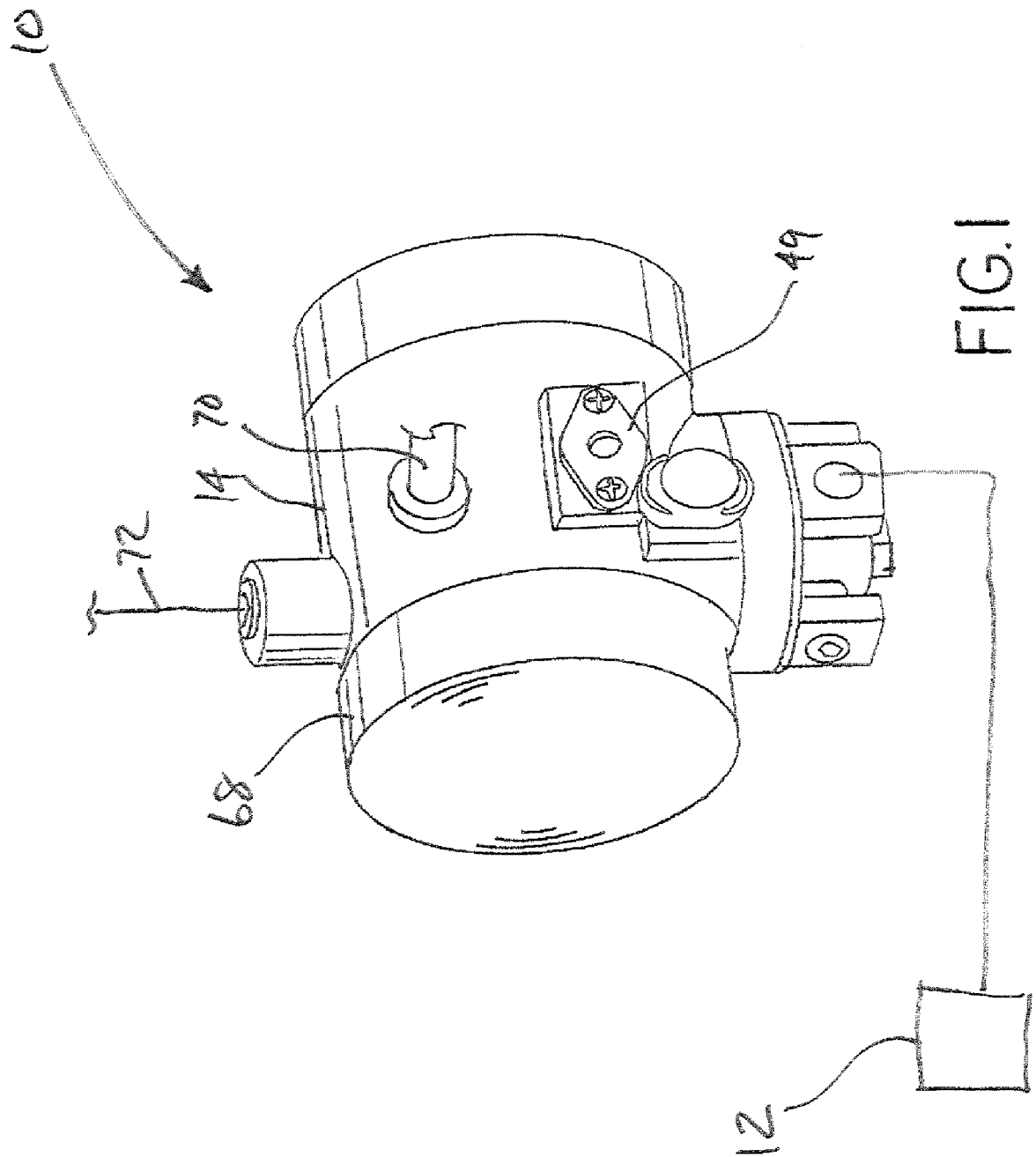
FIG. 1 is a perspective view of a pneumatic device incorporating a selectively variable orifice assembly assembled in accordance with the teachings of the present invention.

Referring now to the drawings, FIG. 1 shows a pneumatic device 10, which may take the form of a pressure transducer. The pressure transducer 10 is connected to a suitable air supply 12 illustrated schematically in FIG. 1. Such a pressure transducer 10 typically converts an incoming pneumatic signal supplied by the air supply 12 at, for example, typically in the range of 20 psig, to a desired output pneumatic current.

Figure 6:
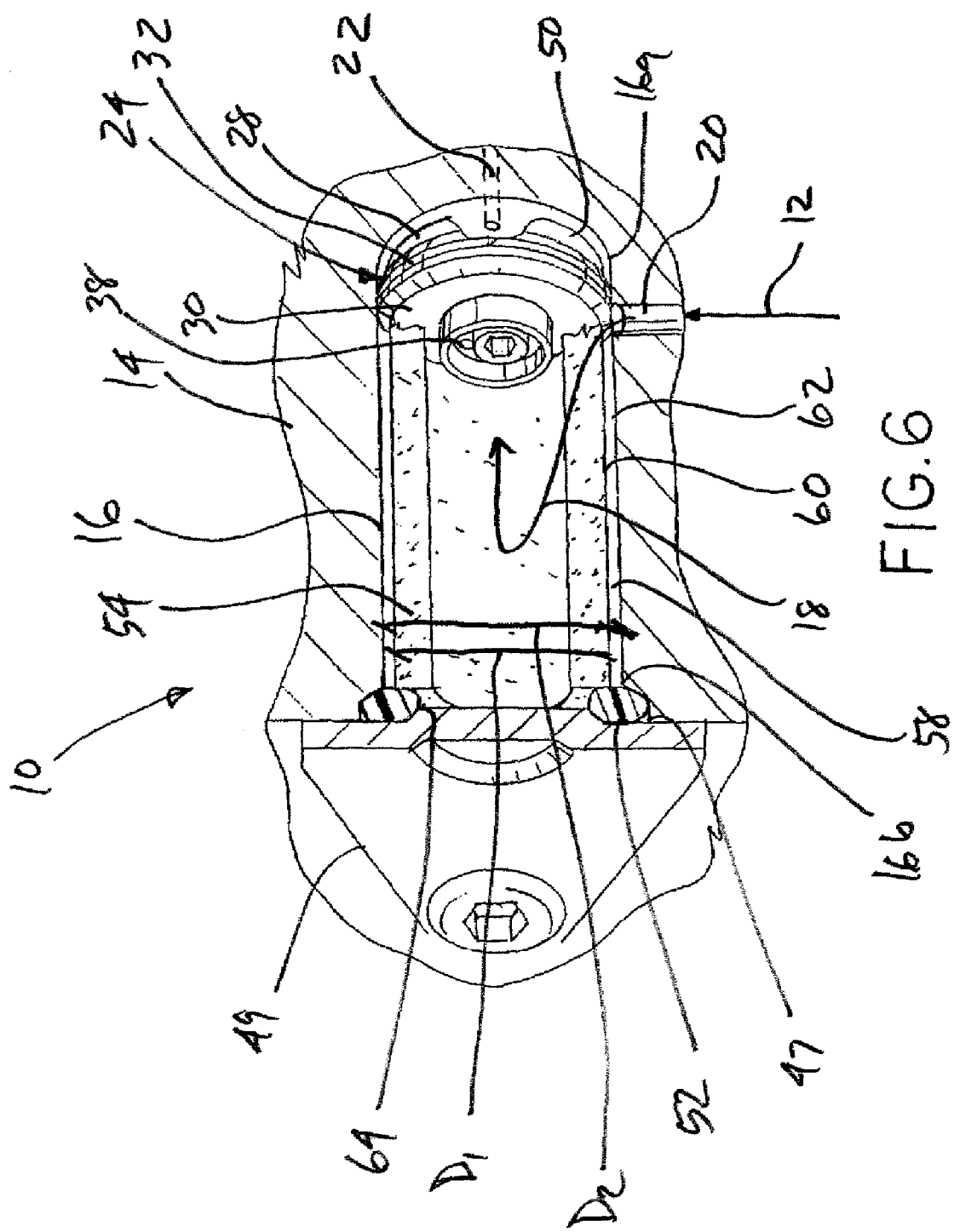
FIG. 6 is an enlarged fragmentary perspective view, partly in section, of the pneumatic device of FIG. 1 and illustrating the selectively variable orifice assembly disposed in the cylindrical chamber.
Figure 7:
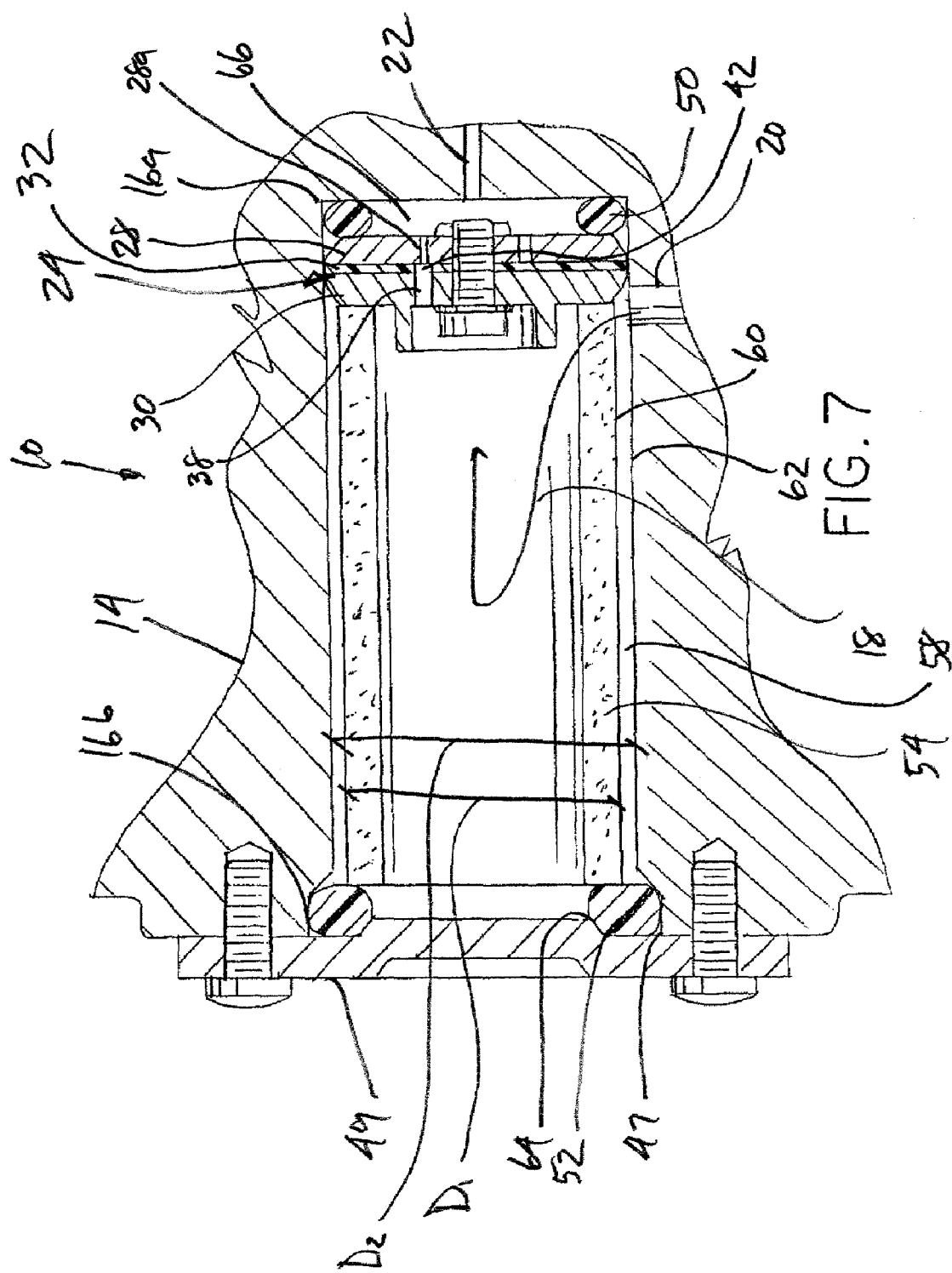
FIG. 7 is an enlarged cross-sectional view illustrating the selectively variable orifice assembly disposed in the cylindrical chamber.

Referring now to FIGS. 6–7, the pressure transducer 10 includes a body 14 having a cylindrical chamber 16, which is disposed in a flow path 18 which extends generally between an inlet bore 20 and an outlet bore 22. The inlet bore 20 is inflow communication with the air supply 12. A selectively variable orifice assembly assembled in accordance with the teachings of the present invention is shown and is generally referred to by the reference 24. As shown in FIGS. 5–8, the orifice assembly 24 is sized for insertion inside the cylindrical chamber 16.

Figure 2:
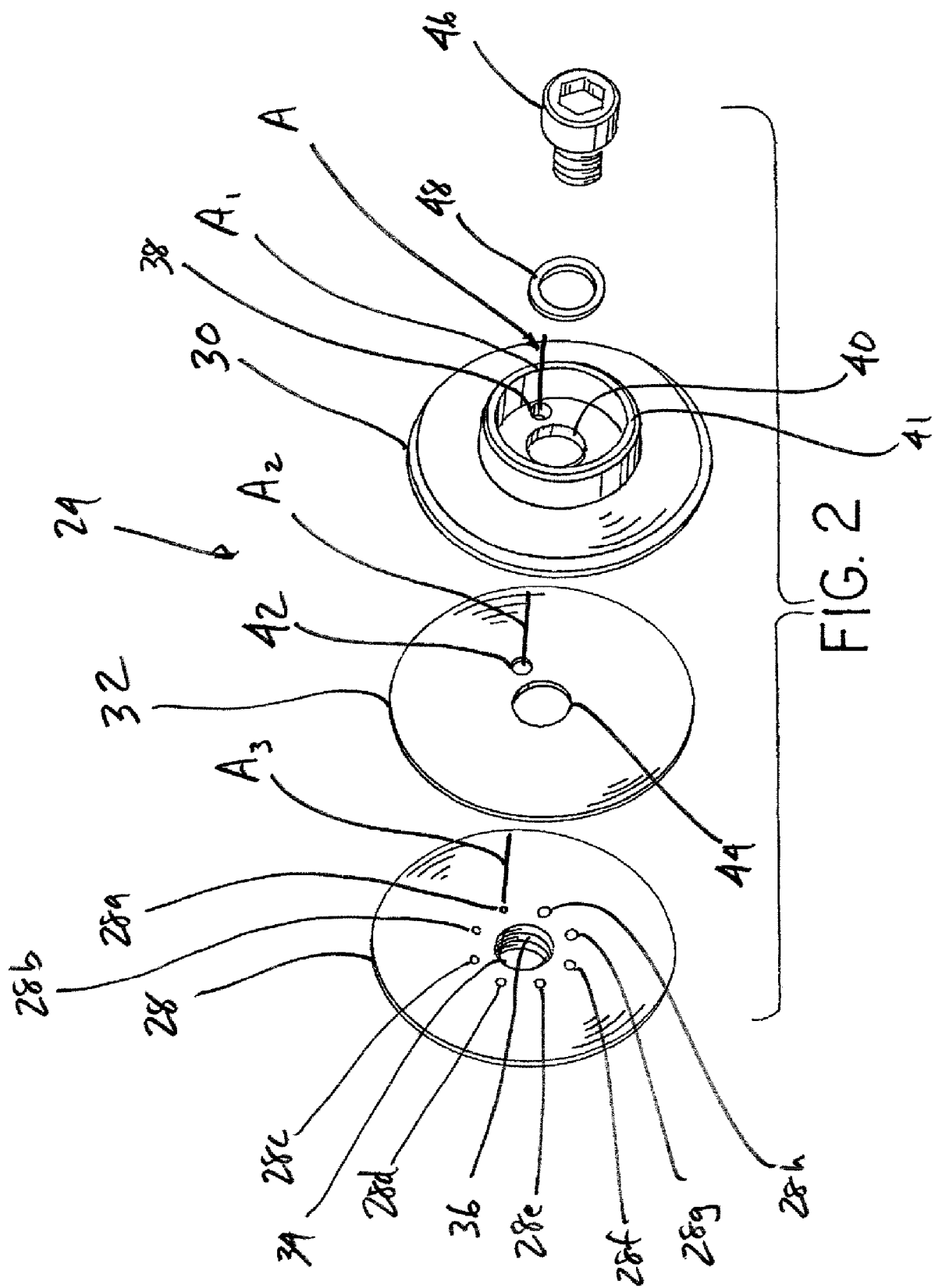
FIG. 2 is an enlarged exploded view in perspective of a selectively variable orifice assembly.

Referring now to FIG. 2, the orifice assembly 24 is shown and includes an orifice plate 28, a selector plate 30, and a seal 32. The orifice plate 28 includes a plurality of through holes or primary orifi 28a through 28h. The orifice plate 28 may include additional or fewer primary orifi as desired. The orifice plate 28 further includes a central mounting aperture 34 provided with suitable threads 36. The selector plate 30 includes a control orifice 38 and a central mounting aperture 40 surrounded by a raised flange 41. The seal 32 includes an orifice 42 and a central mounting aperture 44.

Figure 4:
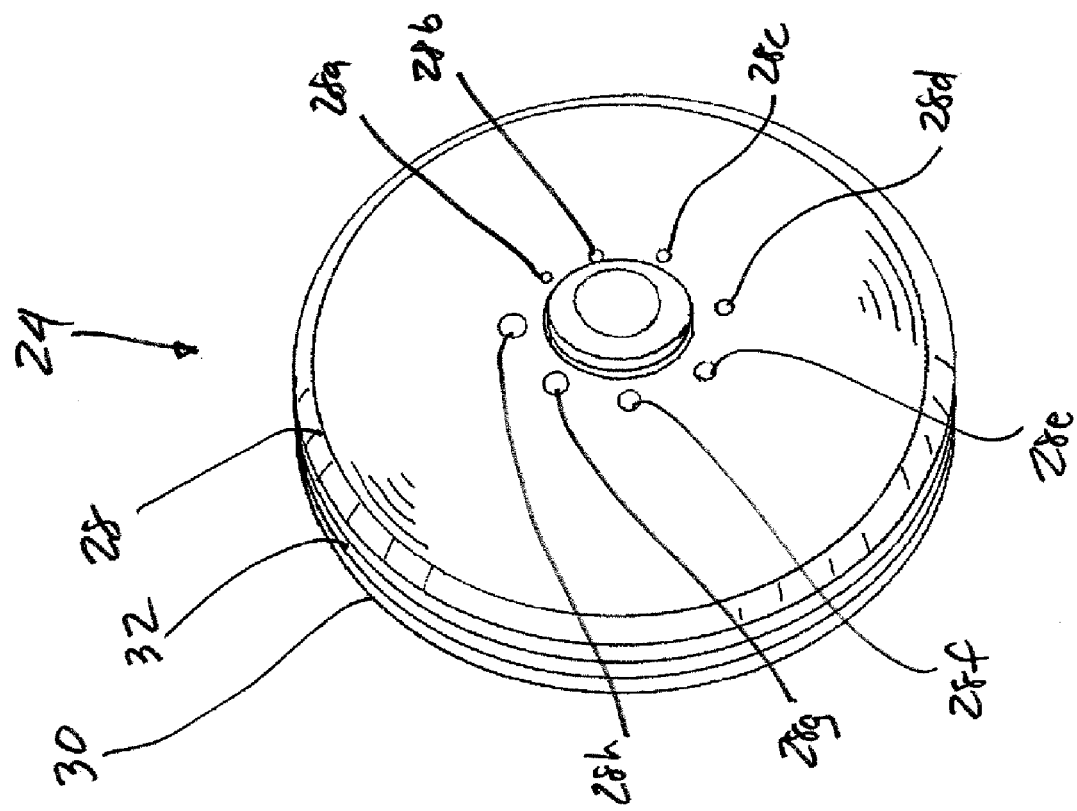
FIG. 4 is another enlarged perspective view of the selectively variable orifice assembly.
Figure 3:
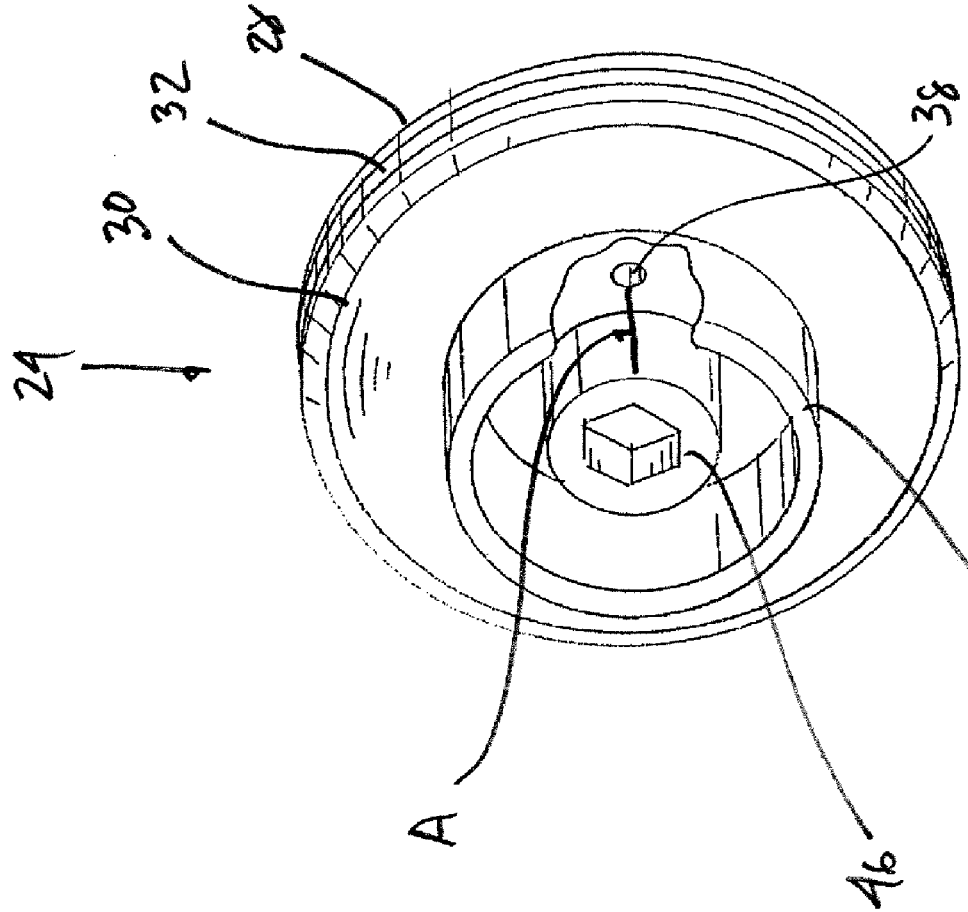
FIG. 3 is an enlarged perspective view of the selectively variable orifice assembly.
Figure 5:
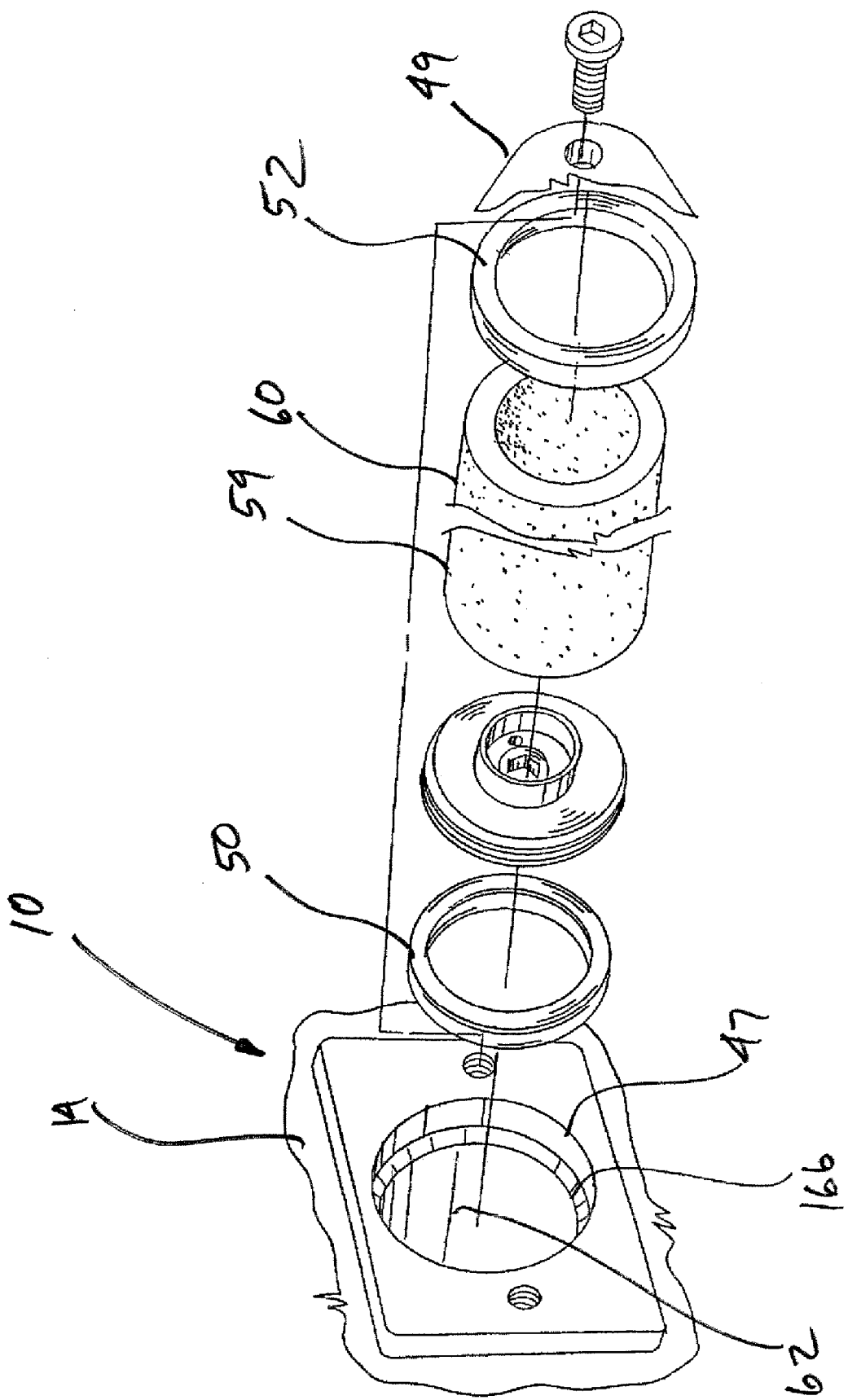
FIG. 5 is an enlarged perspective view of the selectively variable orifice assembly shown adjacent to a cylindrical chamber in the pneumatic device.

Preferably, orifice plate 28, the selector plate 30 and the seal 32 are each generally disk-shaped, and the mounting apertures 34, 40, and 44 are located such that the apertures may be axially aligned such that the orifice plate 28, the selector plate 30, the seal 32 may be connected to one another (such as is shown in FIGS. 3 and 4) using a suitable fastener 46 and an optional washer 48. It will be appreciated that, when assembled as shown in FIGS. 3 and 4, the fastener 46 will engage the threads 36 on the orifice plate 28.

It will also be appreciated that, when the orifice assembly 24 is situated as shown, the control orifice 38, the orifice 42 and a selected one of the primary orifi 28a through 28h may be aligned along a single axis A. In the example shown, an axis $A_1$ of the control orifice 38 on the selector plate 30 is aligned with an axis $A_2$ of the orifice 42 on the seal 32 and with an axis $A_3$ of the primary orifice 28a of the orifice plate 28. It will be appreciated that the orifice assembly 24 may be with the assembled such that another one of the primary orifi 28b through 28h is aligned with the control orifice 38 and the orifice 42.

In the disclosed example, it will be appreciated that the orifice plate 28, the selector plate 30, and the seal 30 all take the form of concentric disks. Other suitable shapes may be chosen, and the orifice plate 28, the selector plate 30, and the seal 32 may each be a different shape relative to one another. Further, it will be appreciated that the seal 32 is preferably formed from a resilient material such as rubber. Other materials may prove suitable.

Referring now to FIGS. 5–8, the cylindrical chamber 16 includes an inner end 16a (obscured in FIG. 5) and an outer end 16b. The cylindrical chamber 16 is disposed in the body 14 such that the outer end 16b of the cylindrical chamber 16 defines an access port 47 which may be covered by a removable cover 49. The removable cover 49 may be attached by suitable fasteners.

The cylindrical chamber 16 is sized to receive a pair of O-rings 50, 52 and an air filter 54. The air filter 54 is preferably cylindrical and includes a generally cylindrical inner bore 56. Still preferably, and referring now to FIGS. 6–8, the air filter 54 includes an outer diameter $D_1$ which measures slightly less then a diameter $D_2$ of the cylindrical chamber 16. Due to the difference between the diameters $D_1$ and $D_2$, an annular gap 58 is defined between an outer surface 60 of the air filter 54 and the inner surface 62 of the cylindrical chamber 16.

The removable cover 49 includes a generally circular seat 64 sized to abut the outer O-ring 52. The inner O-ring 50 is sized to be disposed adjacent to the inner end 16a of the cylindrical chamber 16. When assembled as shown, the orifice assembly 24 abuts the inner O-ring 50, and the air filter 54 abuts the orifice assembly 24. In turn, the air filter 54 is abutted by the O-ring 52, with the components thus held in place by the cover plate 49. The inner O-ring 50 seals the area around the outlet bore 22, while the O-ring 52 seals the area around the cover plate 49.

Accordingly, air flowing along the flow path 18 is generally confined within the cylindrical chamber 16 and flows in through the inlet bore 20, along the flow path 18 through the gap 58, through the filter 54, through the orifice assembly 24, into a space 66 bounded by the orifice assembly 24, the end 16a of the chamber 16, and the O-ring 50, and exits the cylindrical chamber 16 through the outlet bore 22.

In use, the orifice assembly 24 may be assembled such that the control orifice 38 (and the adjacent orifice 42 in the seal 32) is aligned with a selected one of the primary orifi 28a through 28h (i.e., by selecting any one of the primary orifi 28a, 28b, 28c, 28d, 28e, 28f, 28g, or 28h). In the disclosed example, this is accomplished simply by disassembling and then re-assembling the orifice assembly 24 in the concentric arrangement of, for example, FIGS. 3 and 4, with the selected primary orifice 28a–28h aligned with the control orifice. It will be appreciated that, due to the disc-shaped or plate-shaped arrangement of the disclosed example the remaining primary orifi are obstructed by the balance of the selector plate and/or the seal 32. The seal 32 need not take the form of a disc-shaped seal or gasket. Instead, the seal may take the form of a separate ring, or the confronting faces of the selector plate 30 and the orifice plate 28 may be adapted to form a seal without a separate component.

Figure 8:
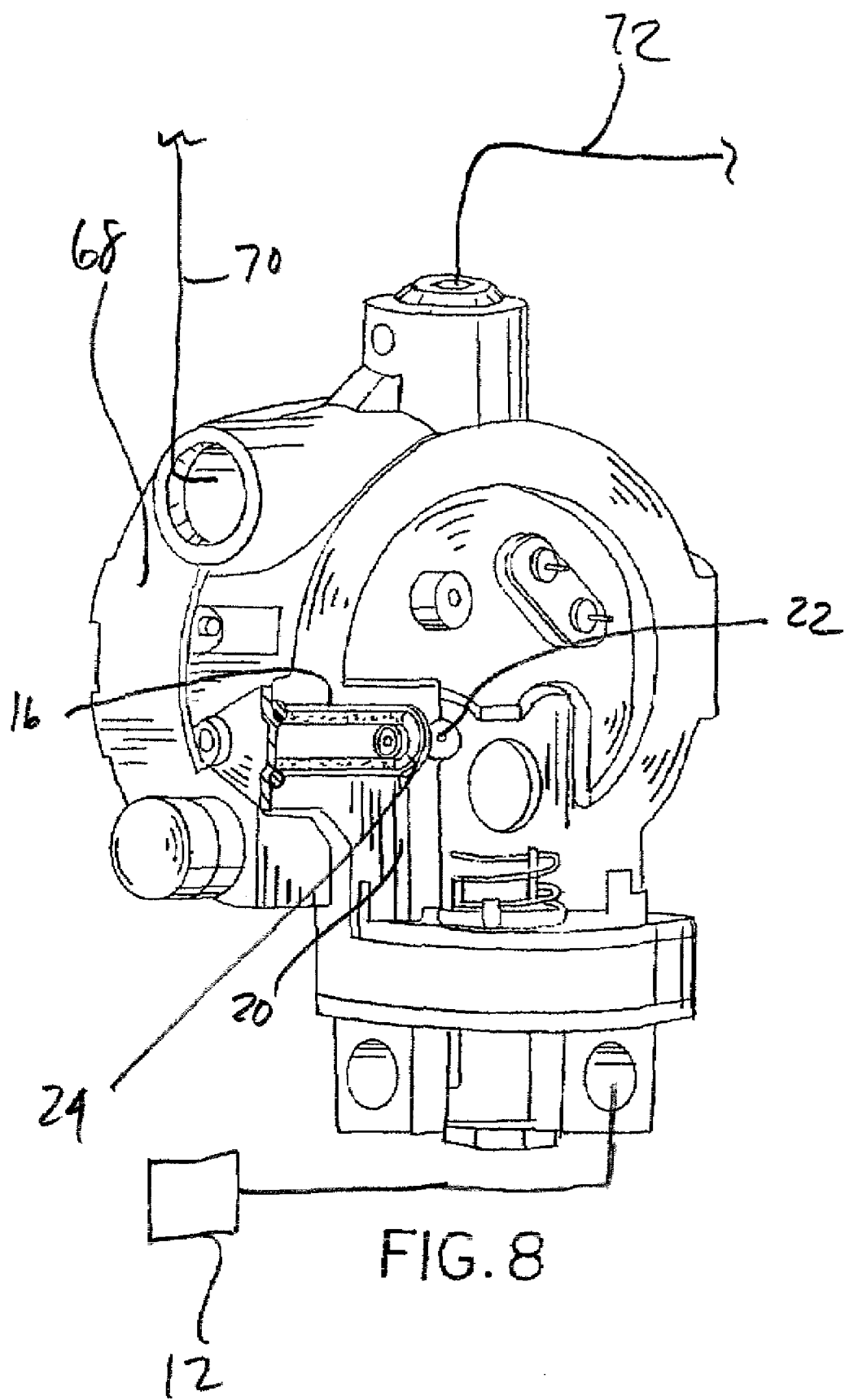
FIG. 8 is a perspective view, to cut away, illustrating the selectively variable orifice assembly disposed inside the pneumatic device.

As shown in FIG. 8, the pneumatic device 10 includes a current-to-pressure transducer 68, which may be of conventional construction. The current-to-pressure transducer 68 includes an electrical input 70 and a pneumatic output 72 in flow communication with the outlet bore 22. The orifice assembly 24 in accordance with the disclosed example permits better control over the pneumatic output 72.

In further accordance with the disclosed example, the pneumatic device 10 and corporation the above-described orifice assembly 24 may produce consistent dynamic characteristics or relationships between the gain and phase of the electro-pneumatic assembly operating with an otherwise fixed passageway geometry (i.e., the size of the outlet bore 22 remains fixed). In accordance with the disclosed example, variable tuning of the pneumatic device 10 may be achieved by providing a controlled pneumatic current 72 out of the current-to-pressure transducer, which may provide for optimal performance in the application. In accordance with the disclosed example, this is achieved by providing a discrete set of passageway orifi in order to change the dynamic response of the instrument.

Numerous additional modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed as new and desired to be protected by Letters Patent of the United States is:

1. A pneumatic device having a selectively variable pneumatic output and comprising:
   an air chamber having an inlet adapted for connection to a source of pressurized air and an outlet, the inlet and the outlet in flow communication along a flow path;
   an orifice plate disposed in the flow path between the inlet and the outlet, the orifice plate including a first primary orifice having a first size and a second primary orifice having a second size;
   a selector plate disposed adjacent to the orifice plate and having only a single control orifice and only a single mounting aperture, the selector plate and the orifice plate moveable relative to each other between a first position in which the control orifice is aligned with the first primary orifice to permit flow through the first primary orifice and the control orifice while blocking flow through the second primary orifice, and a second position in which the control orifice is aligned with the second primary orifice to permit flow through the second primary orifice and the control orifice while blocking flow through the first primary orifice; and
   wherein the orifice plate and the selector plat comprise concentric discs.

2. The device of claim 1, including a seal disposed between the orifice plate and the selector plate and having a through hole aligned with the control orifice of the selector plate.

3. The device of claim 1, wherein the orifice plate and the selector plate are attached by a removable fastener.

4. The device of claim 3, wherein the air chamber includes an access port having a removable cover, and wherein the orifice plate and the selector plate are removable through the access port.

5. The device of claim 1, including a filter disposed in the flow path, the filter sized to abut at least one of the selector plate and the orifice plate.

6. The device of claim 1, including only a single seal plate disposed between the selector plate and the orifice plate and having a through hole maintained in alignment with the control orifice, and wherein the orifice plate, the selector plate, and the seal plate comprise concentric discs.

7. The device of claim 6, wherein each of the selector plate, the orifice plate and the seal plate includes a mounting aperture, and wherein the mounting apertures are axially aligned.

8. The device of claim 1, including a fastener operatively connecting the orifice plate and the selector plate, the fastener arranged to permit changing the orifice plate and the selector plate between the first position and the second positions.

9. A pneumatic device having a selectively variable pneumatic output and comprising:
   an inlet adapted for connection to a source of pressurized air and an outlet, the inlet and the outlet in flow communication along a flow path;
   a variable orifice plate disposed in the flow path between the inlet and the outlet, the variable orifice plate including a plurality of differently sized primary orifi; and
   a selector plate operatively associated with the variable orifice plate and having only a single secondary orifice and a mounting orifice, the selector plate concentric with the orifice plate, the selector plate and the variable orifice plate moveable relative to each other between a plurality of positions, the primary orifi arranged on the variable orifice plate to permit the secondary orifice of the selector plate to be selectively aligned with any one of the primary orifi while blocking the remaining primary orifi.

10. The device of claim 9, wherein the orifice plate and the selector plate comprise discs.

11. The device of claim 9, including a seal arranged between the orifice plate and the selector plate.

12. The pneumatic device of claim 9, including a seal positioned adjacent to the control orifice to control leakage adjacent the control orifice.

13. The pneumatic device of claim 9, including a seal plate disposed between the selector plate and the orifice plate, and wherein the seal plate, the selector plate and the orifice plate comprise concentric discs.

14. The pneumatic device of claim 10, wherein the primary orifi are arranged in a circle about an axis of the discs.

15. The pneumatic device of claim 14, wherein the pneumatic device includes a housing having a cylindrical chamber disposed in the flow path, and wherein the discs are sized for insertion in the cylindrical chamber, and further including a filter sized for insertion in the chamber and arranged to abut at least one of the discs.

16. The device of claim 9, including a fastener operatively connecting the orifice plate and the selector plate, the fastener arranged to permit changing the orifice plate and the selector plate between the first position and the second positions.

17. The device of claim 9, including an air chamber in the flow path and having an access port with a removable cover, and wherein the orifice plate and the selector plate are removable through the access port.

18. A pneumatic device having a selectively variable pneumatic output and comprising:
   an inlet adapted for connection to a source of pressurized air and an outlet, the inlet and the outlet in flow communication along a flow path;
   a variable orifice plate disposed in the flow path between the inlet and the outlet, the variable orifice plate including a plurality of differently sized primary orifi;
   a selector plate operatively associated with the variable orifice plate and having a secondary orifice, the selector plate and the variable orifice plate moveable relative to each other between a plurality of positions the primary orifi arranged on the variable orifice plate to permit the secondary orifice of the selector plate to be selectively aligned with any one of the primary orifi while blocking the remaining primary orifi;
   an air chamber in the flow path and having an access port with a removable cover, the orifice plate and the selector plate being removable through the access port; and
   a cylindrical filter sized for insertion through the access port and into the air chamber, the filter further sized to maintain at least one of the orifice plate and the selector plate in abutment with an end of the air chamber.

19. The device of claim 9, including a seal disposed between the selector plate and the orifice plate and having a through hole maintained in alignment with the control orifice, and wherein the orifice plate, the selector plate, and the seal plate comprise axially aligned concentric discs.

20. A pneumatic device having a selectively variable pneumatic output and comprising:
   a chamber having an inlet and an outlet;
   the inlet adapted for connection to a source of pressurized air, the inlet and the outlet in flow communication along a flow path;
   a control assembly disposed in the chamber along the flow path, the control assembly comprising concentric discs, the control assembly including a plurality of differently sized primary orifi; and
   the control assembly including a selector having a mounting aperture and only a single secondary orifice, the selector moveable relative to the primary orifi between a plurality of positions, the primary orifi and the secondary orifice arrangeable relative to one another to permit the secondary orifice to be in flow communication with a selected one of the primary orifi, the control assembly further arranged to block the remaining primary orifi when the secondary orifice is aligned with the selected one of the primary orifi.

21. A pneumatic device having a selectively variable pneumatic output and comprising:
   an air chamber having an inlet adapted for connection to a source of pressurized air and an outlet, the inlet and the outlet in flow communication along a flow path;
   an orifice plate disposed in the flow path between the inlet and the outlet, the orifice plate including a first primary orifice having a first size and a second primary orifice having a second size; and
   a selector plate disposed adjacent to the orifice plate and having a control orifice;
   the selector plate and the orifice plate moveable relative to one another between a first position in which the control orifice is aligned with the first primary orifice to permit flow through the first primary orifice and the control orifice while blocking flow through the second primary orifice, and a second position in which the control orifice is aligned with the second primary orifice to permit flow through the second primary orifice and the control orifice while blocking flow through the first primary orifice; and
   a fastener directly engaging both the selector plate and the orifice plate and operatively coupling the selector plate and the orifice plate to one another.

22. The device of claim 21, including only a single seal disposed between the selector plate and the orifice plate, the seal including an orifice alignable with the control orifice.

23. The device of claim 22, wherein the orifice plate, the selector plate, and the seal comprise concentric disks.

24. The device of claim 22, including a housing having an air chamber in the flow path and enclosed by a removable cover, the ofifice plate, the selector plate, and the seal all disposed within the air chamber.

* * * * *

UNITED STATES PATENT AND TRADEMARK OFFICE
CERTIFICATE OF CORRECTION

PATENT NO. : 7,201,360 B2 Page 1 of 1
APPLICATION NO. : 10/906374
DATED : April 10, 2007
INVENTOR(S) : Barry L. Gaarder et al.

It is certified that error appears in the above-identified patent and that said Letters Patent is hereby corrected as shown below:

On the Title Page

Item (73), "Fisher Controls International, LLC." should be -- Fisher Controls International LLC --.

At column 3, line 16, "inflow" should be -- in flow --.

At Column 5, line 34, "plat" should be -- plate --.

At Column 6, line 55, "positions" should be -- positions, --.

At Column 8, line 27, "ofifice" should be -- orifice --.

Signed and Sealed this

Ninth Day of September, 2008

JON W. DUDAS
*Director of the United States Patent and Trademark Office*